United States Patent [19]

Eriksson

[11] 4,109,520
[45] Aug. 29, 1978

[54] METHOD AND MEANS FOR MEASURING WEB TENSION IN PAPER OR FOILS

[75] Inventor: Leif Eriksson, Stockholm, Sweden

[73] Assignee: Svenska Traforskningsinstitutet, Stockholm, Sweden

[21] Appl. No.: 780,518

[22] Filed: Mar. 23, 1977

[51] Int. Cl.$^2$ .............................................. G01L 5/10
[52] U.S. Cl. ................................. 73/143; 73/DIG. 1; 73/581
[58] Field of Search ............. 73/DIG. 1, 517 AV, 67, 73/67.1, 67.2, 143, 144, 581

[56] References Cited

U.S. PATENT DOCUMENTS

| | | | |
|---|---|---|---|
| 3,240,054 | 3/1966 | Ruth | 73/67.2 X |
| 3,403,553 | 10/1968 | Wiener | 73/144 |
| 3,599,485 | 8/1971 | Muhlberg | 73/144 |
| 3,718,037 | 2/1973 | Stringer et al. | 73/144 |

Primary Examiner—Charles A. Ruehl
Attorney, Agent, or Firm—Andrus, Sceales, Starke & Sawall

[57] ABSTRACT

A tension in a paper or foil web is measured by subjecting an area of the web between points of support to transverse oscillations. The impedance of an oscillation generating means located adjacent the web changes with the oscillation and impedance is measured with the transverse oscillation at a frequency approaching the expected fundamental resonant frequency for the web tension under consideration. The damping effect of the transverse oscillations by the web is a function of the web tension.

8 Claims, 5 Drawing Figures

METHOD AND MEANS FOR MEASURING WEB TENSION IN PAPER OR FOILS

BACKGROUND OF THE INVENTION

This invention relates to a method of measuring web tension in paper or foils and means for carrying out the method and especially to such a method and means responsive to transverse oscillations in the web.

In the production or treatment of different elongated members, e.g. printing of paper, plastic or other types of foils, long webs of the member are usually fed between guide rollers, which direct and support the web. It is of the greatest importance that the web tension of the members be kept under control, and preferably as constant as possible, because a change in web tension in one part of the web will give rise to reactions along the whole web. It is also of the utmost importance that the web tension is maintained at the same level across the whole web, because the web can otherwise be warped, with the risk of quilling, and other unfavorable effects. Therefore, it is desirable to continuously detect the web tension at different places along a paper web or the like, and preferably at several different places across the web at the same time. When continuously detecting the web tension, it is possible to directly apply a control when a change in the web tension is dictated.

The most common type of web tension meter in modern web machines having guide rollers, especially printing machines, includes some type of load cells, on which both ends of the rollers are mounted. When the web is deflected by the guide rollers, the forces on the load cells can be utilized for determination of the web tension. In order that the cells might measure rapid variations of the web tension, the weight of the rollers should be as low as possible. Mechanical vibrations will always arise, however, when the rollers rotate, which disturb the signal measured, and therefore, the rollers generally are made rigid to reduce these vibrations, which in turn results in heavy rollers, especially for broad or wide machines. Consequently, the part of the force on the load cells resulting from the web tension is very small relative to the weight of the rollers. Therefore, the required sensitivity of the load cell is very great, which causes great problems.

Great efforts have been made to find a solution of the above-mentioned problems. There are several known devices in which the whole paper web between two rollers is caused to include transverse vibrations. The resonant frequency of a paper web has a very special and quite definite relationship to the tension of the web. This relationship can be written:

$$f = \frac{n}{2\tau} \sqrt{\frac{T}{m}}$$

where
 $f$ = the resonant frequency
 $T$ = the tension of the web
 $n$ = the overtone for which the web is in resonance
 $\tau$ = the length between the points of support of the web, and
 $m$ = mass per surface unit of the web material.

If $n$, $\tau$, and $m$ are constants, the relationship is simplified to $$f = K\sqrt{T}$$

In this connection, the paper web can essentially be compared to a string on a musical instrument. The resonant frequency of the string, as is well-known, increases in accordance with the amount that the string is stretched. The resonant frequency of the paper web is consequently indicated in accordance with these known devices and the resonant frequency is a measure of the web tension.

There are also prior art devices, where an intermittent oscillation is applied to a part of the web, and the travel time required for the oscillation to reach another point on the web is indicated. This travel time has a special relationship to the web tension.

Both of the above methods are sensitive to external disturbances, such as noise. Because they are to be used in a very noisy environment, the measuring device must be shielded from the noise at the measuring place, which is both troublesome and expensive. Moreover, various overtones occur, which are often indicated by the device instead of the fundamental resonant tone indicating the web tension. The result on a measuring device operating according to the above-mentioned principles will then be quite misleading. Therefore, these methods have not been used to a large extent in practice.

SUMMARY OF THE INVENTION

It is the object of the invention to provide a method and means of measuring the web tension especially in paper webs, which operate satisfactorily independently of the environment. This is achieved in the invention by giving the method and means the characteristic features defined in the claims.

Tests have shown that the new web tension meter and system has a series of advantages over the tension meters and systems previously known. The meter of this invention has great accuracy and no restrictions of the measuring range. A transmitter which is used cannot be overloaded, has high stability, an insignificant zero drift and no hysteresis. The calibration constants are determined only by the material of the web on which a measurement is to be effected. The transmitter can be easily applied to the web and it can be arbitrarily placed in a machine without influencing its calibration. It is insensitive to mechanical vibrations and electrical disturbances, does not have any inertia and is therefore also able to measure rapid variations in web tension. It has small dimensions and is light weight and is therefore suitable for movement along the web to measure profiles of web tension. The measuring system is also well adapted for the supervision of several transmitters at the same time.

The measuring system can be adapted to the existing need. A simple instrument with a measuring head can be made for manual handling, and used for the control and regulation of a small machine or for surveying various tensions in a large machine. The measuring system is also very suitable for the supervision of many detectors for simultaneously detecting the web tension in different areas of the web, which may provide optimal control of the web tension in large machines. In a paper-making machine or a printing machine for newspapers having long paper webs, it is possible to arrange several measuring heads in a line along or across the paper web. The output signal from the several measuring heads may be connected to provide outputs in a common instrument.

The invention is more fully described in the following description with reference to the enclosed drawings.

DESCRIPTION OF THE DRAWINGS

The drawings furnished herewith illustrate the best mode presently contemplated by the inventor for carrying out the subject invention in which the above advantages and features are clearly disclosed as well as others which will be readily understood from the following description of such embodiments.

In the drawings.

DESCRIPTION OF THE PREFERRED EMBODIMENT

Figure 1:
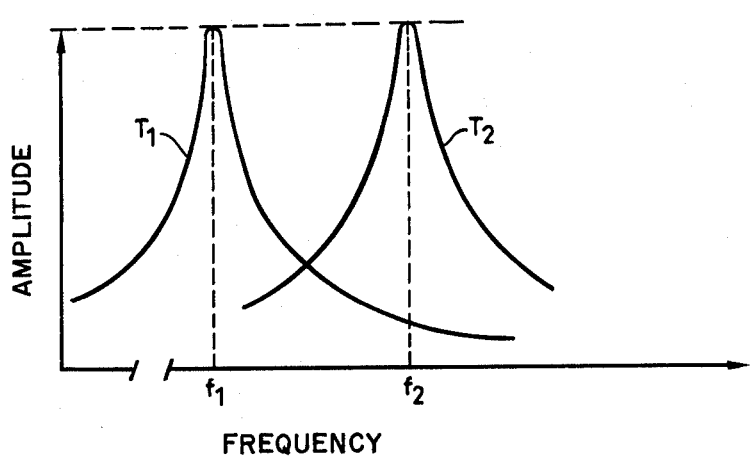
FIG. 1 shows curves of the amplitude of oscillation as a function of the frequency of a paper web with two different web tensions.

FIG. 1 shows two curves of the amplitude of oscillation as a function of the frequency, where a web, e.g. of paper, has been subjected to transverse oscillations between two well-defined points of support along the web by means of a sinusoidally varying force of a predetermined amplitude. It is apparent from the figure that resonant frequency, is different for different tension T of the web. At the web tension $T_1$, the resonant frequency is $f_1$ and at the tension $T_2$ the resonant frequency is $f_2$. It is also evident from FIG. 1 that there is a range adjacent the resonant frequency, for the same tension in the material, within which the amplitude varies with an increasing value as the frequency approaches the resonant frequency.

Figure 2:
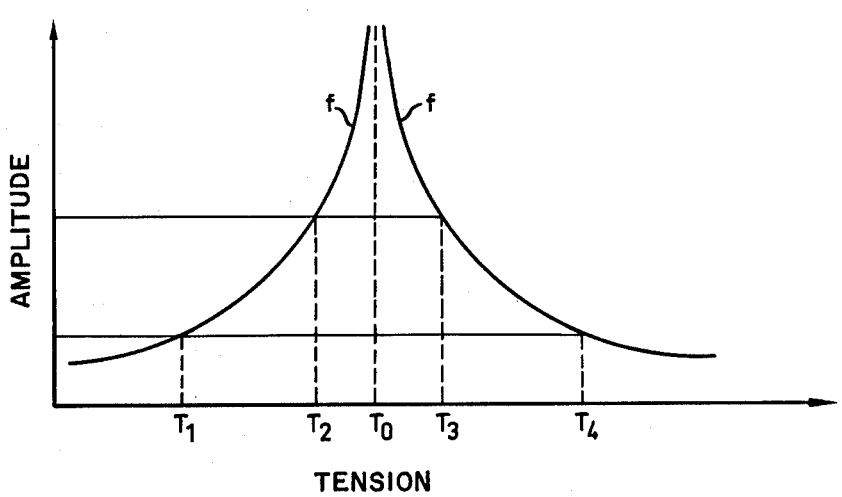
FIG. 2 shows a curve of the amplitude of oscillation as a function of the web tension of a paper web with applied oscillation of a given frequency.

As indicated above, the relationship between the frequency and the web tension can be written $f = k\sqrt{T}$, when the mass per surface unit of the web and the length between the points of support is constant. This indicates that the configuration of each of the curves shown in FIG. 1 would be of the same type if the frequency $f$ was maintained constant and the web tension T was varied. Such a curve is shown in FIG. 2. This Figure shows that a resonance of the paper web will occur for the web tension $T_0$, as the amplitude of the web oscillation increases in amplitude as the tension approaches the resonant web tension. According to the invention, either of these ranges is utilized to determine the web tension of the material. In accordance with this invention the web is subjected to transverse oscillations between two support points along the web by means of a sinusoidal force of predetermined amplitude and frequency. The amplitude of oscillation of the web is determined, and is a measure of the web tension. In practice, the frequency of the force should be either somewhat above or somewhat below the expected fundamental resonant frequency of the web for the web tensions in question, i.e. $T_0$ should either be slightly higher or lower than each expected web tension of the material. A calibration curve may be achieved by drawing the part of the curve lying to the left or to the right of $T_0$ for known web tensions, and when utilizing this method for measuring the tension of a paper web having otherwise similar properties, only the amplitude of the oscillation in the material needs to be read. The web tension is then obtained by means of the calibration curve. If the web tension measured is far from the highest or the lowest web tension expected, the amplitude of the oscillation of the web is correspondingly low and the measurement can be repeated employing a lower or a higher frequency than the previously selected frequency. However, this new frequency is selected so that it lies above or below that previous frequency used in the previous measurement so as to approach the fundamental resonant frequency of the web for the web tension value desired. This case will give a curve branch running steeply, where small variations in web tension will result in large changes of amplitude. By using this possibility of changing the frequency of the applied force, a measuring range can always be selected for each web on each occasion that gives a high resolution of the signal. Switching between different measuring ranges can be performed automatically.

Figure 3:
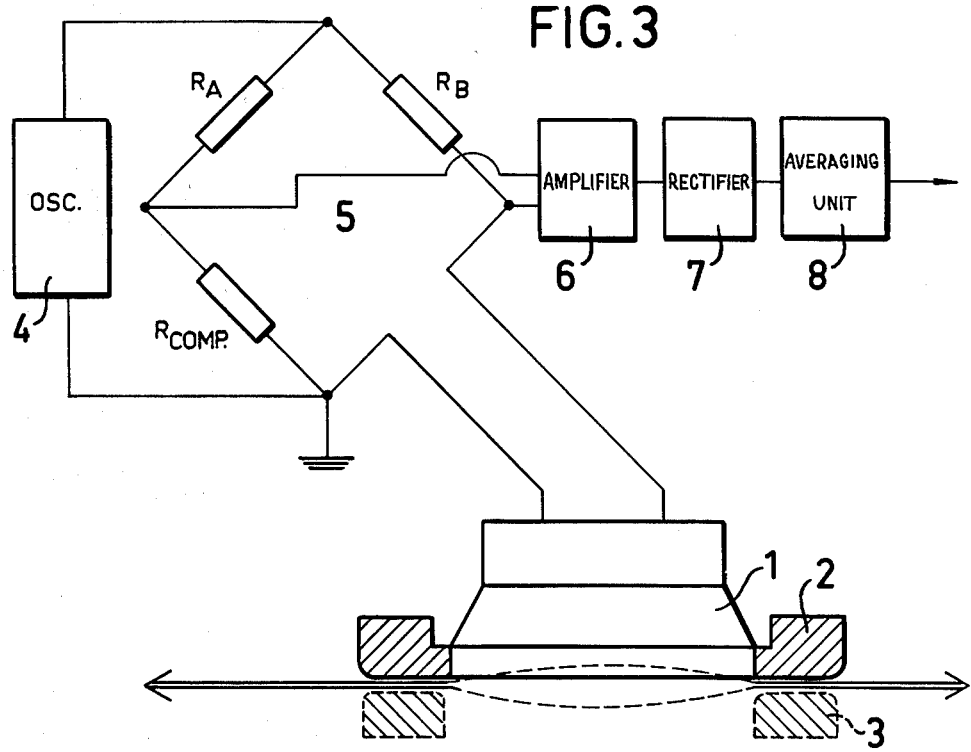
FIG. 3 is a block diagram of an arrangement according to the invention.
Figure 4:
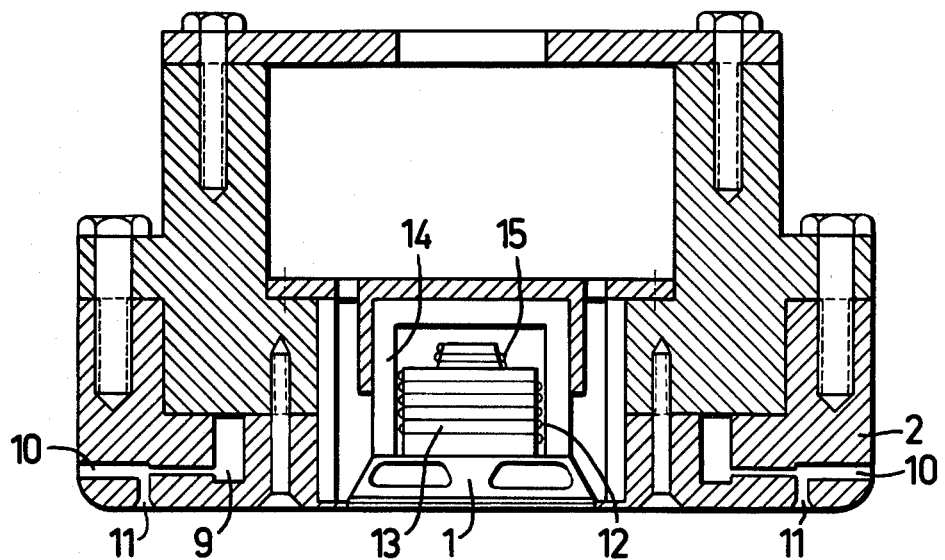
FIG. 4 is a section through a measuring head according to the invention.

In FIG. 3, an embodiment of a device for carrying the method of the invention into practice is diagrammatically shown. In FIG. 3, a measuring head includes an electrodynamic loudspeaker 1 with a circular supporting ring 2 around the front part of the loudspeaker cone. The supporting ring of the loudspeaker is placed against the web, the tension of which is to be determined, with the ring tightly fitting to the material. A tight fit is preferably made by providing the ring with an air suction channel having apertures opening towards the web, as shown in FIG. 4, for enabling the ring to be sucked to the web. Other types of adhesion between the ring and the web are of course possible, such as a counterpressure ring 3 arranged on the opposite side of the web from the web tension meter, with the web gripped between the supporting ring and the counterpressure ring.

The loudspeaker coil is fed with an A.C. signal having a constant amplitude and frequency. This A.C. signal is generated by an oscillator 4, connected to one of the diagonals of a bridge circuit 5, having a loudspeaker coil connected to one branch, as shown in FIG. 3. In another branch of the bridge a separate loudspeaker coil $R_{comp}$ is connected and located close to the loudspeaker. The separate loudspeaker coil $R_{comp}$ has the same data as the loudspeaker coil.

This coil $R_{comp}$ is so arranged that it will reach the same temperature as the loudspeaker coil. The two other branches of the bridge comprise impedance elements, preferably resistor elements $R_A$ and $R_B$, having a constant impedance.

The web acts as an external membrane attached to the loudspeaker cone. The vibration of the membrane dampens the loudspeaker and creates a variation in the impedance of the loudspeaker coil in accordance with its attenuation. This impedance variation is reflected in the bridge and an output signal appears across the other diagonal of the bridge circuit. An amplifier 6 is connected to the latter diagonal and its output is connected to a rectifier 7 to provide a rectified signal. An averaging device 8 is connected to the rectifier 7 and produces a direct current output signal which represents the web tension. The relationship between the web tension and the signal level is determined by calibration against a known web tension.

FIG. 4 shows a cross section of a preferred embodiment of the measuring head for a web tension meter according to the invention. The frame of the measuring head is shown in a diagonal cross section, whereas, for illustrative purposes, the loudspeaker in the center part is shown in a side elevational view. As is apparent from FIG. 4, the frame is divided into two portions. A first portion at the front side of the loudspeaker cone, i.e. the support ring 2, is provided with an annular air channel 9, from which radial channels 10 extend. Perpendicularly to these radial channels 10, suction channels 11 are provided opening in the surface of the ring 2 facing the web. These can either be made as separate channels or as a total or partial annular groove. Air is supplied to the air channels 9 and flows out through the channels 10 and as a result of the ejector effect of the air stream moving past channels 11, a suction force will result in the channels 11.

The loudspeaker 1 is attached to the center part of the frame and is an electrodynamic loudspeaker of common design. The measuring head in this embodiment is to be used for measuring the paper web in a papermaking machine having a high humidity content and a temperature that may be about 100° C. The measuring transducer or head of the illustrated embodiment is heated for compensating the influence of condensation and temperature variations. A control system is provided for keeping its temperature constant. Heating is performed electrically by means of a heating coil 12, wound around the loudspeaker magnet 13. A cap 14 is located around the magnet and provides heat insulation. A thermostat not shown, is adapted to be located in the cap and connected in the energizing circuit of the heating coil 12. Moreover, an extra loudspeaker coil 15, corresponding to coil $R_{comp}$ is arranged on a bobbin.

Figure 5:
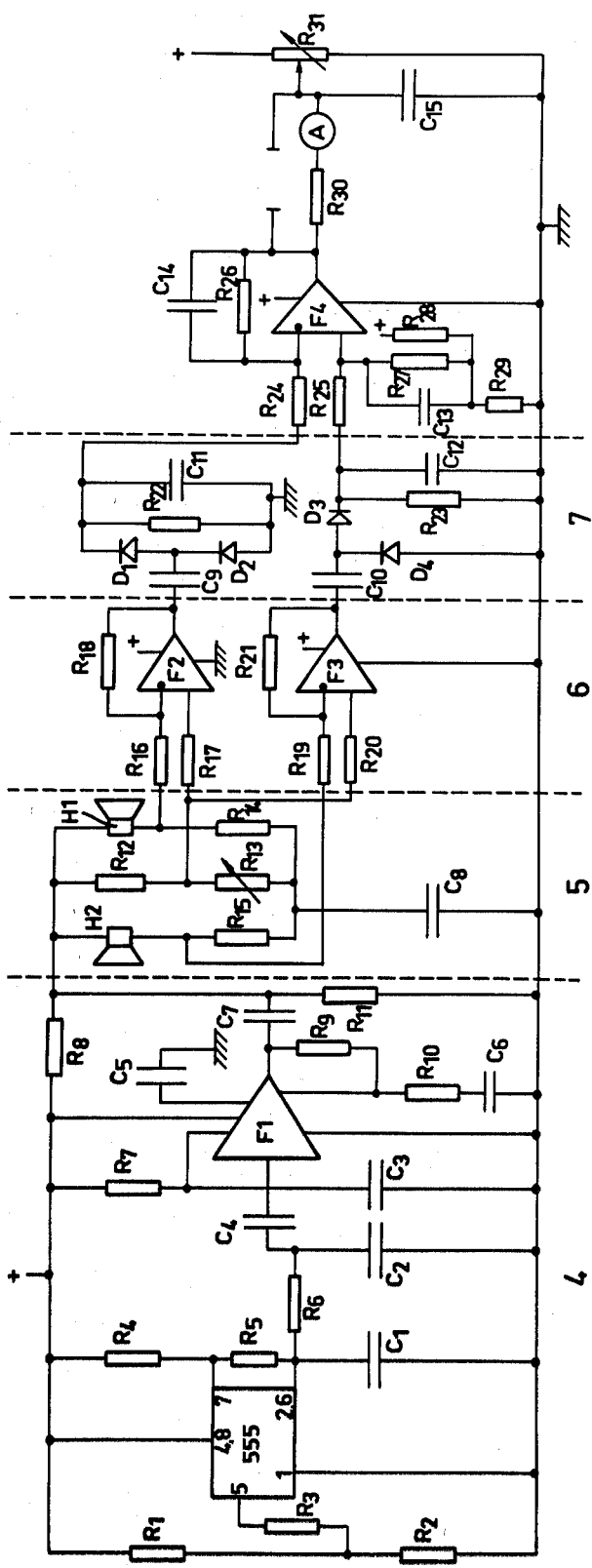
FIG. 5 is a schematic wiring diagram of a web tension meter according to the invention.

In FIG. 5, a wiring diagram of an embodiment of a web tension meter according to the invention is shown. The circuit in FIG. 5 is shown divided into sections corresponding to the blocks of FIG. 3 with a corresponding reference numeral under each section. The oscillator 4 is based on an integrated circuit (IC-circuit) of the type LM555, which is generally identified as a timer and for which the frequency and the pulse duration are determined by the resistors $R_4$ and $R_5$ and the capacitor $C_1$. A triangular output signal is derived from the capacitor $C_1$ and is fed via a resistor $R_6$ and a capacitor $C_4$, connected in series to an amplifier $F_1$. At the junction between the resistor $R_6$ and the capacitor $C_4$, a capacitor $C_2$ is connected to a common ground. The approximately sinusoidal output signal from the amplifier $F_1$ is applied across the one diagonal of two bridge circuits which are connected i parallel and have two resistors $R_{12}$ and $R_{13}$ as common branches and a separate loudspeaker and a further resistance branch. In this embodiment, one loudspeaker H1 is used for the web tension measuring and the other loudspeaker H2 is matched to the first loudspeaker H1. According to this embodiment, loudspeaker H12 is allowed to perform free oscillations and is placed close to the first loudspeaker H1, thus attaining the same temperature as the first loudspeaker. The loudspeaker H2 is thus used for temperature control. The common resistors $R_{12}$ and $R_{13}$ of the bridge circuits are connected across one bridge diagonal. The other bridge diagonals of the two bridges are connected one each to the input of a separate operational amplifier. Thus, the signal through the resistor $R_{12}$ and the loudspeaker H1 is supplied to the operational amplifier F2, and the signal through the resistor $R_{12}$ and the loudspeaker H2 is supplied to the operational amplifier F3. The output signals from the two amplifiers F2 and F3 are connected via separate capacitors $C_9$ and $C_{10}$, to separate rectifiers one of which includes diodes $D_1$ and $D_2$ and the other of which includes diodes $D_3$ and $D_4$. The diodes $D_2$ and $D_4$ are connected between the input capacitor $C_9$ and $C_{10}$ respectively and ground, with the corresponding anodes connected to ground. Diodes $D_1$ and $D_3$ having their anodes connected to the connection points between the respective input capacitors $C_9$ and $C_{10}$ and the first diodes $D_2$ and $D_4$. Furthermore, there is a parallel connection of a resistor $R_{22}$ and a capacitor $C_{11}$ across diodes $D_1$ and $D_2$ and of a resistor $R_{23}$ and a capacitor $C_{12}$ across the second diodes $D_3$ and $D_4$. The output signals from the two rectifiers are connected to another operational amplifier F4, the output signal from which is detected either with an ammeter, as shown, a recording instrument, or another suitable device. The output is an unambigous function of the impedance change in the coil of the loudspeaker H1 due to the influence of the web. The basic impedance of the coil of loudspeaker, e.g. the impedance that should appear without the influence of the web, is completely compensated for by the coupling to the additional matched loudspeaker H2.

When the web tension is to be measured at several places across a web, several web tension meters of the above-mentioned type are preferably located beside each other and are fed by an oscillator common to all the meters. The output signals from the different meters are preferably indicated on instruments arranged in line beside each other to form a common instrument having a distinct vertical level indication. In this construction, a difference between the output signals will be readily detectable by a glance at the instruments.

Instead of using a loudspeaker of standard type to apply a sinusoidal force to the web via an air cushion between the loudspeaker cone and the web, an electrodynamic arrangement can be performed, where either the coil or the magnet is directly attached to the web by means of e.g. air suction, thus directly exerting a sinusoidal force on the web when feeding a sinusoidal current through the coil. The impedance variation in the coil is then measured as described above.

The output signal of the instrument is not directly proportional to the web tension, and therefore a linearization network may be connected before the output. Such a network may consist of series connections of a resistor and a Zener diode connected in parallel and mutually matched so that a curve representing the output signal as a function of the web tension will be linear and equal for all the meters when several web tension meters are operated in parallel.

An example of component values for FIG. 5 is listed below:

$R_1$ = 6.8 kohm
$R_2$ = 3.3 kohm
$R_3$ = 1.2 kohm
$R_4$ = 1.2 kohm
$R_5$ = 1.5 kohm
$R_6$ = 100 ohm
$R_7$ = 180 kohm
$R_9$ = 33 kohm
$R_{10}$ = 68 ohm
$R_{11}$ = 4.7 kohm
$R_{12}$ = 25 ohm
$R_{13}$ = 100 ohm
$R_{14}$ = $R_{15}$ = 25 ohm
$R_{16}$ = $R_{17}$ = 5.1 kohm
$R_{19}$ = $R_{20}$ = 4.7 kohm
$R_{18}$ = $R_{21}$ — 100 kohm
$R_{22}$ = $R_{23}$ = 15 kohm
$R_{24}$ = $R_{25}$ = 1 kohm
$R_{26}$ = 82 kohm
$R_{27}$ = 82 kohm
$R_{28}$ = 1,2 kohm $C_1$ = $C_2$ = $C_3$ = $C_9$ = $C_{10}$ = 1 uF
$C_4$ = $C_5$ = 10 uF
$C_6$ = $C_7$ = 100 uF
$C_8$ = 1000 uF
$C_{11}$ = $C_{12}$ — 15 uF
$C_{13}$ = 0.1 uF
$C_{14}$ = 100 nF
$C_{15}$ = 47 uF
F1 = TBA 915
F2 = F3 — F4 — LM 308
$D_1$ — $D_4$ = AA 119

-continued $R_{29}$ = 1,2 kohm
$R_{30}$ = 10 kohm
$R_{31}$ = 50 kohm

What I claim is:

1. A method for measuring the web tension of a running paper or foil web member under tension and having a resonant frequency related to the tension in the web, including the steps of supporting the member in a preselected area including a plurality of spaced supports longitudinally spaced in a direction along the web, subjecting the preselected area of the web to transverse oscillations of constant frequency, said transverse oscillations having an amplitude between two limit values proportional to the web tension, and coupling a measuring means to said area and generating a signal proportional to the amplitude of the transverse oscillations, said frequency selected to approach the fundamental resonant frequency of the web for said web tension.

2. The method of claim 1 including subsequently generating transverse oscillation of a constant frequency selected to more closely approach the fundamental resonant frequency if the amplitude measured with the first named frequency is significantly less than the desired web tension.

3. A device for measuring the web tension in a running paper or foil web member in a web portion of a selected area, comprising an electrodynamic vibration generator adapted to be placed close to the web member in said selected area, means for applying a substantially sinusoidally varying transverse force having constant amplitude and constant frequency to said web and generate transverse oscillations in the web, said generator having an impedance related to said movement of the web, and means for measuring the impedance variations of the electrodynamic vibration generator caused by the damping influence of the oscillations of said area of the web, said means producing an output related to the tension in the web.

4. The device of claim 3, in which the electrodynamic vibration generator is an electrodynamic loudspeaker placed close to the web.

5. The device of claim 4, in which said loudspeaker includes a loudspeaker cone having an outer support ring adapted to be placed in close contact with the web to form said area, and means for holding the ring into close contact with the web.

6. The device of claim 5, in which said means for holding the support ring into close contact with the web consists of air suction channels arranged in the support ring and having apertures directed towards the web.

7. The device of claim 4, in which said loudspeaker includes an operating magnet and coil, an additional coil is arranged around the magnet of the electrodynamic loudspeaker for providing a means for compensating temperature variations of said loudspeaker operating magnet and coil.

8. The device of claim 7, in which said additional coil has substantially the same properties as the original electrodynamic coil of the loudspeaker and is arranged to attain substantially the same temperature as said coil of the loudspeaker, each one of said additional coil and said loudspeaker coil being connected in one branch of an impedance bridge.

* * * * *